(12) United States Patent
Tseng (10) Patent No.: US 12,153,386 B2
(45) Date of Patent: Nov. 26, 2024

(54) INTELLIGENT OPERATION CONTROL APPARATUS AND SYSTEM

(71) Applicant: Kingtronics Institute of Science and Technology (Xiamen) Co., Ltd, Fujian (CN)

(72) Inventor: Chee Henry Tseng, Fujian (CN)

(73) Assignee: Kingtronics Institute of Science and Technology (Xiamen) Co., Ltd., Xiamen (CN)

( * ) Notice: Subject to any disclaimer, the term of this patent is extended or adjusted under 35 U.S.C. 154(b) by 495 days.

(21) Appl. No.: 17/505,059

(22) Filed: Oct. 19, 2021

(65) Prior Publication Data

US 2022/0035322 A1 Feb. 3, 2022

(30) Foreign Application Priority Data

Feb. 20, 2021 (CN) .......................... 202110192755.6

(51) Int. Cl.
*G05B 13/02* (2006.01)
*G06N 5/02* (2023.01)
*H04L 67/12* (2022.01)
*H04L 67/125* (2022.01)
*H04L 69/08* (2022.01)

(52) U.S. Cl.
CPC ........... *G05B 13/0265* (2013.01); *G06N 5/02* (2013.01); *H04L 67/12* (2013.01); *H04L 69/08* (2013.01); *H04L 67/125* (2013.01)

(58) Field of Classification Search
None
See application file for complete search history.

(56) References Cited

U.S. PATENT DOCUMENTS

| | | | |
|---|---|---|---|
| 9,674,963 B1* | 6/2017 | Sari | B41M 7/0045 |
| 2017/0048308 A1* | 2/2017 | Qaisar | H04L 41/0895 |
| 2018/0234510 A1* | 8/2018 | Sharma | G06F 16/285 |
| 2019/0140939 A1* | 5/2019 | Schooler | H04L 67/5651 |
| 2020/0374238 A1* | 11/2020 | Momchilov | H04L 47/781 |

FOREIGN PATENT DOCUMENTS

| | | | | |
|---|---|---|---|---|
| CN | 109491301 A | * | 3/2019 | |
| CN | 107423619 B | * | 6/2020 | ............. G06F 21/53 |
| CN | 111479048 A | | 7/2020 | |
| CN | 112788142 A | * | 5/2021 | ............. H04L 67/10 |

* cited by examiner

Primary Examiner — Derrick W Ferris
Assistant Examiner — Keith Follansbee (57) ABSTRACT

The present disclosure provides an intelligent operation control apparatus and system. The apparatus includes: a plurality of intelligent operation control systems; the intelligent operation control system is configured to include edge intelligent operation control systems, second-level intelligent operation control systems and nth-level intelligent operation control systems, wherein n is an integer greater than or equal to 2; each intelligent operation control system includes an operation hub and at least one intelligent operation control terminal; the operation hub is at least one server; the IoT of the industrial Internet can be quickly built, thereby enabling digital upgrade of the industry.

4 Claims, 3 Drawing Sheets

INTELLIGENT OPERATION CONTROL APPARATUS AND SYSTEM

CROSS-REFERENCE TO RELATED APPLICATIONS

This application claims the benefit of priority from Chinese Patent Application No. 202110192755.6, filed on Feb. 20, 2021. The content of the aforementioned application, including any intervening amendments thereto, is incorporated herein by reference in its entirety.

FIELD

The present disclosure relates to the field of computer technology, in particular to an intelligent operation control apparatus and system.

BACKGROUND

Due to historical reasons, most of the existing controllers, sensors, instruments and devices each have different communication interfaces and different communication protocols, which makes information interaction and interconnection of devices difficult. In this era of Internet of Everything, various industries are developing towards the integration of automation and informatization. There is an urgent need to solve the parsing and conversion of various protocols and realize the coordination and unification of IoT (Internet of Things) systems on the premise of ensuring security.

With the development of cloud computing technology, cloud desktop (virtual desktop) emerged. It runs the user's desktop on the server in the data center in the form of a virtual machine. After connecting to the virtual machine in the back-end data center through the network, the user side can work just using a display device and an input-output device. All computations and data storage occur in the data center, and the design of security and stability of the data center is much stronger than that of ordinary desktop computers. In the meanwhile, since the desktop side no longer has requirements on computing and storage performance, the desktop side devices can be simplified thin client side devices, which greatly improves the failure rate and service life and reduces the capital investment of desktop devices. However, traditional cloud desktop technology cannot easily achieve low latency and time certainty required by industrial control.

Edge computing is a novel computing mode that provides applications with resources of computing, storage and networks at the edge of the network close to things or sources of data. At the same time, edge computing is also an enabling technology. By providing these resources at the edge of the network, the key requirements of the industry in agile connection, real-time business, data optimization, application intelligence, and security and privacy protection are met. For various application scenarios, how to build an efficient and secure terminal-edge-cloud collaborative computing system in still under exploration in the industry.

SUMMARY

The technical problem to be solved by the present disclosure is to provide an intelligent operation control apparatus and system. Device communication and protocol conversion are executed locally, so microsecond-level latency and nanosecond-level clock synchronization are achieved. The IoT of the industrial Internet can be quickly built, thereby enabling digital upgrade of the industry.

In a first aspect, the present disclosure provides an intelligent operation control apparatus, including: a plurality of intelligent operation control systems; wherein the intelligent operation control system is configured to include edge intelligent operation control systems, second-level intelligent operation control systems and nth-level intelligent operation control systems; n is an integer greater than or equal to 2;

a plurality of the edge intelligent operation control systems are connected to one of the second-level intelligent operation control systems;

a plurality of the second-level intelligent operation control systems are connected to one of the third-level intelligent operation control systems; the rest of intelligent operation control systems are connected in this manner;

each of the intelligent operation control systems includes an operation hub and at least one intelligent operation control terminal;

the operation hub is connected to all the intelligent operation control terminals; and the operation hub is at least one server.

Further, the intelligent operation control terminal includes: a processor, a northbound communication module, a southbound communication module and a human-computer interaction interface; the processor is connected to the operation hub through the northbound communication module; the processor is connected to a controlled device through the southbound communication module; and the processor is connected to a control&interface display module through the human-computer interaction interface.

Further, the northbound communication module includes an RJ45 interface, an optical fiber interface and a wireless module; the southbound communication module includes an RJ45 interface, an RS232 interface, a USB interface, an RS485 interface, an RS422 interface, an SMEMA interface, a Bluetooth interface, a WIFI interface and an optical fiber interface; the human-computer interaction interface includes a USB interface, an HDMI interface, a Bluetooth interface, a WIFI interface, an audio interface, a video interface and a wireless communication module; the audio interface is configured to be connected to at least one MIC (microphone) to realize voice control of the intelligent operation control terminal by a user; and the video interface is configured to be connected to a camera to realize face recognition of an intelligent operation control terminal user.

In a second aspect, the present disclosure provides an intelligent operation control system, including: a plurality of intelligent operation control systems; wherein the intelligent operation control system is configured to include edge intelligent operation control systems, second-level intelligent operation control systems, third-level intelligent operation control systems and nth-level intelligent operation control systems; n is an integer greater than or equal to 3;

a plurality of the edge intelligent operation control systems are connected to one of the second-level intelligent operation control systems;

a plurality of the second-level intelligent operation control systems are connected to one of the third-level intelligent operation control systems; the rest of intelligent operation control systems are connected in this manner;

each of the intelligent operation control systems includes an operation hub and at least one intelligent operation control terminal;

the operation hub is connected to all the intelligent operation control terminals;

the edge intelligent operation control system realizes functions such as connection of devices with various communication interfaces, communication protocol parsing and conversion, data encryption and decryption, data transmission, and low-latency operation control;

the second-level intelligent operation control system provides services such as mirroring, backup, data management, operation and maintenance and PaaS; and the third-level intelligent operation control system provides services such as backup, big data management analysis, remote operation and maintenance, enterprise collaboration and resource sharing.

Further, the intelligent operation control terminal includes: a processor, a northbound communication module, a southbound communication module and a human-computer interaction interface;

the processor includes a virtual terminal agent and a data collection and transmission module;

the virtual terminal agent establishes connection and communication with a virtual terminal in the operation hub through the northbound communication module, and establishes connection and communication with a human-computer interaction device through the human-computer interaction interface;

the virtual terminal agent is configured to provide:
1. management of external devices in collaboration with the data collection and transmission module; wherein the external devices include a controlled device and the human-computer interaction device;
2. authentication management, security mode control and strategy control;
3. human-computer interaction information processing and transmission control; and
4. processing and display of interface information transmitted by the virtual terminal and human-computer interaction data transmission;

the data collection and transmission module establishes connection and communication with the virtual terminal in the operation hub through the northbound communication module, and establishes connection and communication with the controlled device through the southbound communication module; and the data collection and transmission module is configured to provide:
1. management and control of the controlled device;
2. management and allocation of communication channels and operation resources; and
3. controlled device communication, data collection, protocol parsing, protocol conversion, data encryption and decryption and data transmission.

Further, a data interaction flow between the virtual terminal and the controlled device includes: a processing and transmission process of controlled device data received by the virtual terminal and a processing and transmission process of data fed back by the virtual terminal to the controlled device.

Further, the processing and transmission process of the controlled device data received by the virtual terminal includes:

Step I:
1) determining a communication protocol of a device data packet received by an RJ45 interface according to characteristics of the data packet and a set of protocols maintained by the intelligent operation control terminal, and parsing the data packet using the corresponding protocol;
2) determining a communication protocol of a device data packet received by an optical fiber interface according to characteristics of the data packet and the set of protocols maintained by the intelligent operation control terminal, and parsing the data packet using the corresponding protocol;
3) determining a communication protocol of a device data packet received by a USB interface according to characteristics of the data packet and the set of protocols maintained by the intelligent operation control terminal, and parsing the data packet using the USB standard protocol;
4) determining a communication protocol of a device data packet received by a WIFI interface according to characteristics of the data packet and the set of protocols maintained by the intelligent operation control terminal, and parsing the data packet using the WIFI standard protocol;
5) determining a communication protocol of a device data packet received by a Bluetooth interface according to characteristics of the data packet and the set of protocols maintained by the intelligent operation control terminal, and entering step II directly for processing;
6) determining a communication protocol of a device data packet received by an RS485/RS422 interface according to characteristics of the data packet and the set of protocols maintained by the intelligent operation control terminal, and entering step II directly for processing;
7) determining a communication protocol of a device data packet received by an RS232 interface according to characteristics of the data packet and the set of protocols maintained by the intelligent operation control terminal, and entering step II directly for processing; and
8) determining a communication protocol of a device data packet received by an SMEMA interface according to characteristics of the data packet and the set of protocols maintained by the intelligent operation control terminal, and entering step II directly for processing;

Step II:
1) adding a data packet identifier ID to all the received data packets or the data packets that have been parsed in step I, and carrying out caching;
2) parsing the data packet according to precedence information configured by the application;
3) determining the communication protocol of the data packet according to the characteristics of the data packet and the set of protocols maintained by the intelligent operation control terminal;
4) parsing the data packet using the corresponding protocol;
5) converting the parsed out data into a custom protocol directly according to data packet length requirements of the network protocol, or splitting the data and converting the split data into the custom protocol; and
6) encrypting the custom protocol data packet by a custom encryption algorithm to obtain an encrypted data packet;

Step III:
1) inserting an information set of device ID, device type, custom protocol type, device protocol type, packet ID, packet length, subpacket ID, subpacket length, verification information, custom encryption information and target virtual terminal information into a header of the encrypted data packet as a custom header of the encrypted data packet; and 2) encapsulating a physical layer, a data link layer, a network layer and a transport layer for the encrypted data packet containing the custom header according to TCP/IP protocol or TSN protocol or OPC-UA protocol or a new generation of industrial time deterministic network protocol to form a network transmission data packet;

Step IV:
1) transmitting the network transmission data packet to the operation hub through the network;
2) parsing, by the operation hub, the network transmission data packet to obtain custom header information and the encrypted data packet, and carrying out caching; and
3) transmitting the custom header information and the encrypted data packet to the corresponding virtual terminal according to the target virtual terminal information in the custom header information;

Step V:
1) parsing, by the virtual terminal, the encrypted data packet according to the custom header information and a self-authorized key to further parse out a custom protocol data packet, and carrying out caching; and
2) parsing out a device protocol data packet from the custom protocol data packet; carrying out subpacket combining in the case that there are subpackets, and then parsing out the device protocol data packet;

Step VI:
1) caching the custom header information; and
2) providing the parsed out device protocol data packet information to an application program for processing.

Further, the processing and transmission process of the data fed back by the virtual terminal to the controlled device includes:

Step I:
1) encapsulating the data to be fed back to the controlled device into a corresponding controlled device communication protocol packet according to the cached corresponding custom header information, and adding an identifier ID to the controlled device communication protocol packet, wherein as required, the packet is divided into subpackets, a subpacket identifier ID is added, and the data packet is encrypted; at the same time, editing the custom header information that is fed back; and
2) encapsulating a physical layer, a data link layer, a network layer and a transport layer for the encrypted data packet containing the custom header according to TCP/IP protocol or TSN protocol or OPC-UA protocol or a new generation of industrial time deterministic network protocol to form a network transmission data packet;

Step II:
1) transmitting the network transmission data packet to the intelligent operation control terminal through the network; and
2) parsing, by the intelligent operation control terminal, the network transmission data packet to obtain custom header information and the encrypted data packet, and carrying out caching;

Step III:
1) parsing the encrypted data packet according to the custom header information to obtain a custom protocol data packet, and carrying out caching; and
2) parsing out a device protocol data packet from the custom protocol data packet according to the custom header information; carrying out subpacket combining in the case that there are subpackets, and then parsing out the device protocol data packet;

Step IV:
transmitting the device protocol data packet to a corresponding controlled device communication channel according to target device information in the custom header information;

Step V:
1) encapsulating a corresponding device data packet transmitted to an RJ45 interface using the corresponding protocol according to the custom header information;
2) encapsulating a corresponding device data packet transmitted to an optical fiber interface using the corresponding protocol according to the custom header information;
3) encapsulating a corresponding device data packet transmitted to a USB interface using the corresponding USB protocol according to the custom header information;
4) encapsulating a corresponding device data packet transmitted to a WIFI interface using the corresponding WIFI standard protocol according to the custom header information;
5) encapsulating a corresponding device data packet transmitted to a Bluetooth interface using the corresponding Bluetooth standard protocol according to the custom header information;
6) entering step VI directly for a corresponding device data packet transmitted to an RS485/RS422 interface;
7) entering step VI directly for a corresponding device data packet transmitted to an RS232 interface; and
8) entering step VI directly for a corresponding device data packet transmitted to an SMEMA interface; and
step VI: transmitting the data packet to the corresponding device.

Further, the operation hub includes infrastructure, a computing system, a storage system, a resource pool, a virtual terminal, application management, operation hub management and access control;
the infrastructure includes a processor, an intelligent data warehouse, network devices and network security devices; the intelligent data warehouse stores data in a data cube structure, and provides a data source for multi-dimensional big data analysis;
the computing system includes CPU resources, memory resources and hard disk resources, and provides logical operations and storage resources;
the storage system includes data access interfaces, various database kernels and data files, and provides storage and access services for various types of data;
the resource pool includes a physical resource pool and an application resource pool; the physical resource pool is a resource sharing pool provided after the computing system and the storage system are virtualized; the application resource pool provides allocation and management of resources required for the operation of various application services;
the application management includes PaaS service, application store, application authorization, application distribution and application deployment;
the operation hub management includes virtual terminal management, container service, virtual machine service, server resource management, operation and maintenance management, and disaster tolerance management;

the access control includes UI user interface entry, system access and authentication control;

the UI user interface entry provides a user interface entry for intelligent operation control terminal users and operation hub administrators;

the system access provides access of a lower-level intelligent operation control system and access to an upper-level intelligent operation control system;

the authentication control provides system security control, identity recognition, security key decryption verification and digital certificate verification for the UI user interface entry and the system access; to access the virtual terminal, the intelligent operation control terminal needs to undergo the authentication control of the operation hub to perform identity and authority recognition/control of the intelligent operation control terminal, and then enter the UI user interface entry to perform identity and authority recognition/control of the user; and the authorization of the intelligent operation control terminal and the authorization of the user are managed and controlled by the operation hub.

Further, the virtual terminal is at least one virtual terminal built by using an application container engine;

the virtual terminal has two environment options: an application development environment and an application program running environment;

the application development environment of the virtual terminal establishes a collaborative development environment for sharing development resources through a PaaS development platform provided by the application management, the PaaS development platform being a development platform provided by an upper-level intelligent operation control system;

the application development environment includes an application development platform interface and development resources; the development resources include an intelligent operation control terminal resource pool, external terminal device interface mapping, an application component pool, a development tool set and application deployment tools, and are configured to develop various business applications, and configuration flows and parameters for rapid deployment, and develop a verified application program and provide the verified application program to an application program list for the intelligent operation control terminal to select and run; and the application program running environment includes two running modes:

the virtual terminal runs an APP and the virtual terminal runs a browser.

One or more technical solutions provided in the embodiments of the present disclosure at least have the following technical effects or advantages:

1. Low latency: device communication and protocol conversion are executed locally, so microsecond-level latency and nanosecond-level clock synchronization are achieved.
2. High bandwidth: Gb+ data transmission meets the large volume data transmission requirements of the industrial Internet.
3. Strong interconnectivity: Based on the Standard Ethernet protocol stack, protocol conversion and custom unified protocol, the intercommunication is simple, which lowers the linking and data collection difficulty of the device manufacturers. The present disclosure breaks traditional chimney-type structure, and promotes the transformation to the horizontal distribution structure, thereby enhancing the interconnection, realizing multisystem collaboration and building digital ecology of the industry.
4. High elasticity: The virtual terminals can be built as required (operation, network), which can realize capacity expansion without awareness and flexible response to business changes.
5. Agile implementation: The IoT of the industrial Internet can be quickly built, thereby enabling digital upgrade of the industry.
6. High security: An independent and controllable security mechanism is established at the protocol layer, and data is transmitted after being encrypted, thereby realizing high security.
7. High economic value: The intelligent operation control systems for the application scenarios such as industrial sites, office environments and shopping malls do not need to use lots of computers. At the same time, the manner of building the virtual terminal in the operation hub greatly enhances the convenience of operation and maintenance, greatly lowers the operation and maintenance costs, and thus, has great economic value.

The above description is only a general description of the technical solutions of the present disclosure. In order to understand the technical means of the present disclosure more clearly such that they can be implemented in accordance with the content of the description, and to make the above and other objects, features and advantages of the present disclosure more comprehensible, a detailed description of the present disclosure will be given below.

BRIEF DESCRIPTION OF THE DRAWINGS

The present disclosure will be further described below with reference to the accompanying drawings in conjunction with embodiments.

DETAILED DESCRIPTION OF EMBODIMENTS

The general idea of the technical solutions in the embodiments of the present disclosure is as follows:

As shown in FIGS. 1 to 6, the present disclosure provides an intelligent operation control system. The intelligent operation control system includes: an operation hub and at least one intelligent operation control terminal.

Figure 1:
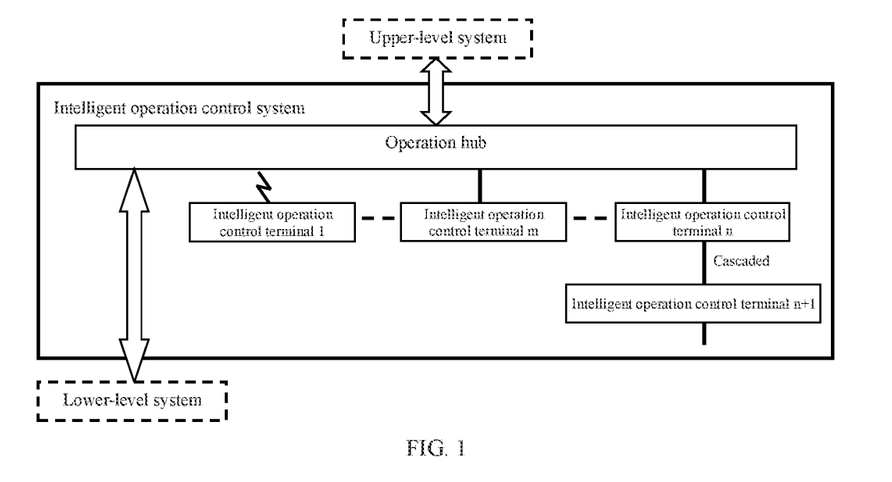
FIG. 1 is a schematic diagram of the overall architecture of an intelligent operation control system according to the present disclosure.

The operation hub is connected to an upper-level system and a lower-level system of similar structure thereto through an optical fiber or a network cable.

Figure 2:
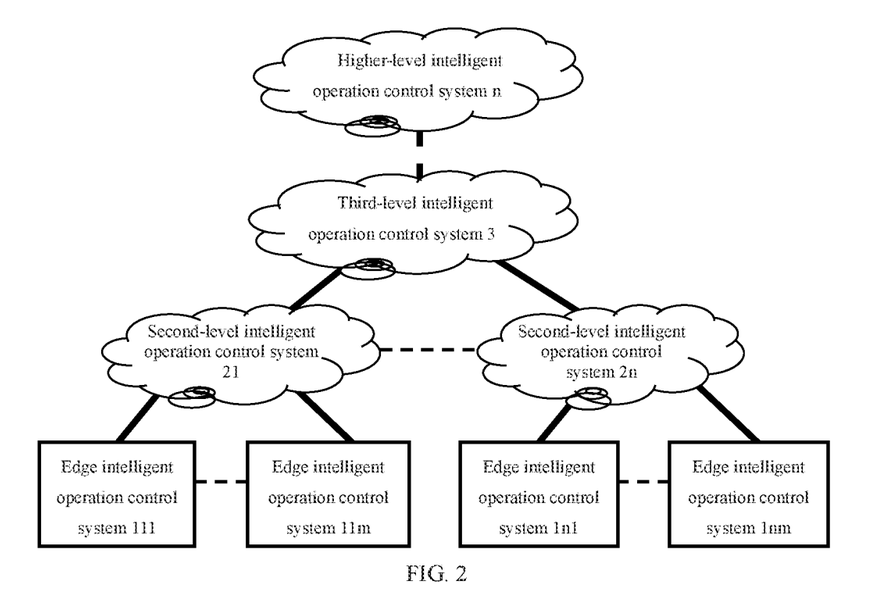
FIG. 2 is a schematic diagram of the multilevel hybrid architecture of an intelligent operation control system according to the present disclosure.

The intelligent operation control system may be built from multilevel hybrid architecture. The lowest-level system is an edge intelligent operation control system, a plurality of the edge intelligent operation control systems may be connected to a second-level intelligent operation control system at the upper level, a plurality of the second-level intelligent operation control systems may be connected to a third-level operation control system at the upper level, and the rest of intelligent operation control systems are connected in this manner to build a multilevel hybrid system as a typical application.

Further, for the edge intelligent operation control system, the operation hub is an edge computing center.

The edge intelligent operation control system realizes functions such as connection of devices with various communication interfaces, communication protocol parsing and conversion, data encryption and decryption, data transmission and low-latency operation control.

The second-level intelligent operation control system can provide services such as mirroring, backup, data management, operation and maintenance and PaaS.

The third-level intelligent operation control system can provide services such as backup, big data management analysis, remote operation and maintenance, enterprise collaboration and resource sharing.

The second-level or higher-level intelligent operation control system is connected to at least one lower-level intelligent operation control system.

The intelligent operation control terminal establishes direct connection with the operation hub through an optical fiber, a network cable or wireless connection.

The intelligent operation control terminal may also be connected to the operation hub in a cascaded manner through an optical fiber, a network cable or wireless connection.

The wireless connection manner includes: WIFI, 5G and next-generation wireless communication technologies.

Figure 3:
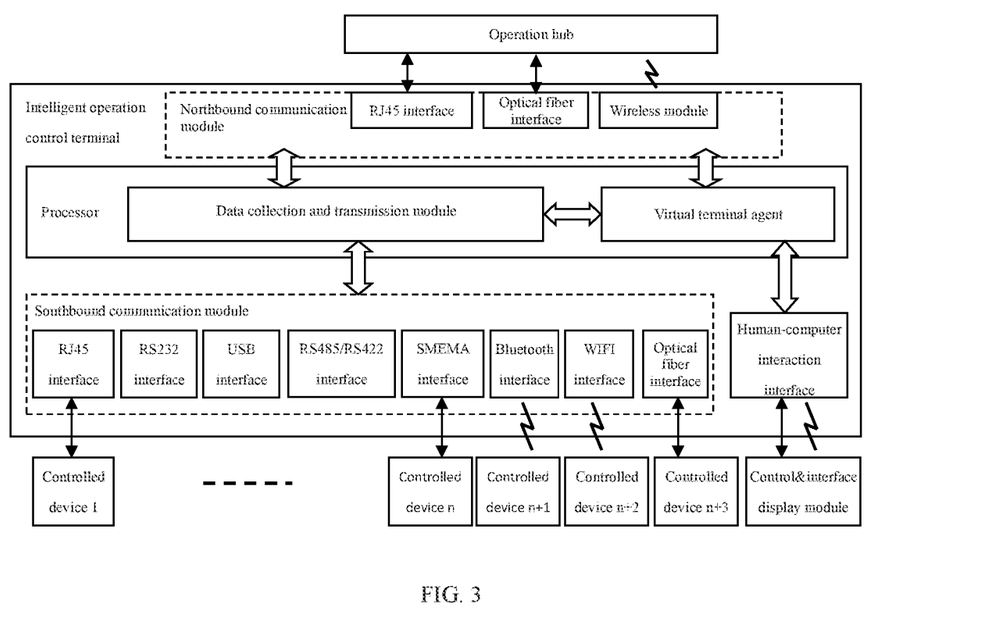
FIG. 3 is a schematic diagram of the architecture of an intelligent operation control terminal according to the present disclosure.

The intelligent operation control terminal includes: a processor, a northbound communication module, a southbound communication module and a human-computer interaction interface.

The processor includes a virtual terminal agent and a data collection and transmission module.

The virtual terminal agent establishes connection and communication with a virtual terminal in the operation hub through the northbound communication module, and establishes connection and communication with a human-computer interaction device through the human-computer interaction interface.

The virtual terminal agent has the following functions:
1. management of external devices (including the controlled device and the human-computer interaction device) in collaboration with the data collection and transmission module;
2. authentication management, security mode control and strategy control;
3. human-computer interaction information processing and transmission control; and
4. processing and display of interface information (controls, status and data) transmitted by the virtual terminal and human-computer interaction data transmission.

The data collection and transmission module establishes connection and communication with the virtual terminal in the operation hub through the northbound communication module, and establishes connection and communication with the controlled device through the southbound communication module.

The data collection and transmission module has the following functions:

1. management and control of the controlled device;
2. management and allocation of communication channels and operation resources; and
3. controlled device communication, data collection, protocol parsing, protocol conversion, data encryption and decryption, data transmission and the like.

Further, the virtual terminal agent and the data collection and transmission module communicate with the virtual terminal of the operation hub by using a virtual terminal transport protocol.

As a typical application, the virtual terminal transport protocol can divide the northbound communication channel of the virtual terminal agent and the northbound communication channel of the data collection and transmission module into at least two independent channels for transmission, thereby efficiently utilizing the bandwidth resources and ensuring low-latency communication.

The northbound communication module includes an optical fiber interface, an RJ45 interface, and a wireless module (WIFI, 5G or next-generation wireless communication technology), and is responsible for establishing connection and communication with the operation hub.

The southbound communication module includes an RJ45 interface, an RS485/RS422 interface, an RS232 interface, an SMEMA interface, a USB interface, a WIFI interface, a Bluetooth interface, an optical fiber interface and the like, and is responsible for establishing connection and communication with various types of controlled devices. The optical fiber interface and the RJ45 interface can realize cascade connection of the intelligent operation control terminals.

The human-computer interaction interface includes a USB interface, an HDMI interface, a Bluetooth interface, a WIFI interface and other wireless communication modules. The HDMI interface is connected to a display, and the USB interface, the Bluetooth interface, the WIFI interface, an audio interface, a video interface and the wireless communication module of the human-computer interaction interface. The wireless communication module establishes connection and communication with a human-computer interaction device such as a mouse and a keyboard. The audio interface may be connected to at least one MIC to realize voice control of the intelligent operation control terminal by a user. The video interface may be connected to a camera to realize face recognition of an intelligent operation control terminal user, which can be used for user identity verification, sign-in and the like.

Figure 4:
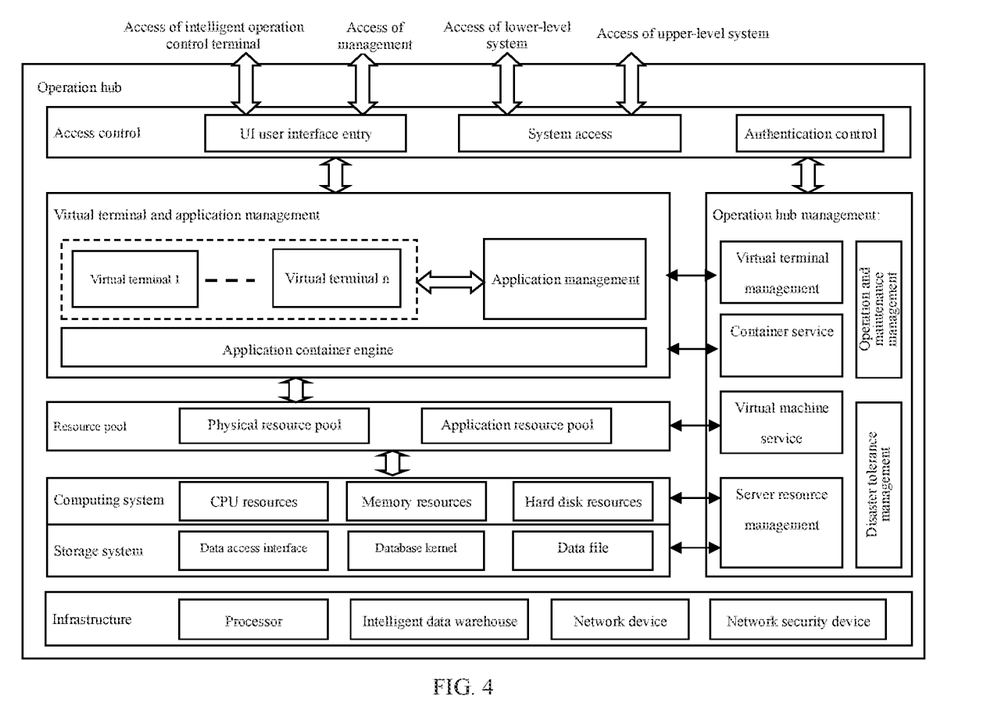
FIG. 4 is a schematic diagram of the architecture of an operation hub according to the present disclosure.

The operation hub includes infrastructure, a computing system, a storage system, a resource pool, a virtual terminal, application management, operation hub management and access control.

The infrastructure includes a processor, an intelligent data warehouse, network devices, network security devices and other server hardware resources.

Further, the intelligent data warehouse stores data in a data cube structure, and provides a data source for multi-dimensional big data analysis.

The computing system includes CPU resources, memory resources and hard disk resources, and provides logical operations and storage resources.

The storage system includes data access interfaces, various database kernels and data files, and provides storage and access services for various types of data.

The resource pool includes a physical resource pool and an application resource pool.

The physical resource pool is a resource sharing pool provided after the computing system and the storage system are virtualized.

The application resource pool provides allocation and management of resources required for the operation of various application services, for example, allocation of CPU, allocation of memory and allocation of bandwidth.

The application management includes functions such as PaaS service, application store, application authorization, application distribution and application deployment. The specific applications may include artificial intelligence applications, machine vision applications, algorithm services, protocol parsing, protocol conversion, data encryption and decryption and the like.

Further, the PaaS service and the application store may be services provided by the upper-level intelligent operation control system.

The operation hub management includes virtual terminal management, container service, virtual machine service, server resource management, operation and maintenance management, and disaster tolerance management.

The access control includes UI user interface entry, system access and authentication control.

The UI user interface entry provides a user interface entry for intelligent operation control terminal users and operation hub administrators.

The system access provides access of a lower-level intelligent operation control system and access to an upper-level intelligent operation control system.

The authentication control provides system security control, identity recognition, security key decryption verification, digital certificate verification and other functions for the UI user interface entry and the system access, thereby providing a security guarantee for the access of the operation hub.

To access the virtual terminal, the intelligent terminal needs to undergo the authentication control of the operation hub to perform identity and authority recognition/control of the intelligent terminal, and then enter the UI user interface entry to perform identity and authority recognition/control of the user. The authorization of the intelligent terminal and the authorization of the user are managed and controlled by the operation hub.

The lower-level system can access the operation hub only after the authorization of the operation hub management. The operation hub provides authorized system services to the lower-level system.

The operation hub can access the upper-level system only after the authorization of the operation hub management of the upper-level system. The upper-level system provides authorized system services to the operation hub.

The virtual terminal is at least one virtual terminal built by using an application container engine. Further, the virtual terminal has two environment options: an application development environment and an application program running environment.

Figure 5:
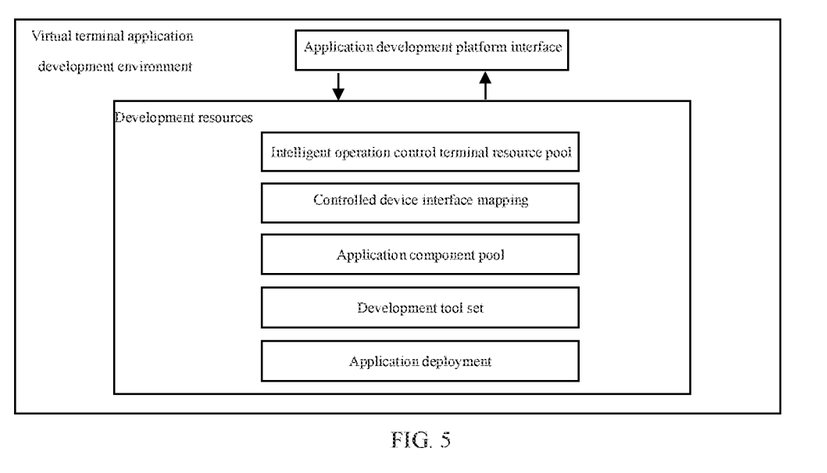
FIG. 5 is a schematic diagram of a functional structure of an application development environment according to the present disclosure.

The application development environment of the virtual terminal establishes a collaborative development environment for sharing development resources through a PaaS development platform provided by the application management. The PaaS development platform may be a development platform provided by an upper-level intelligent operation control system. The application development environment includes an application development platform interface and development resources. The development resources include an intelligent operation control terminal resource pool, external terminal device interface mapping, an application component pool, a development tool set, application deployment tools and the like, can agilely develop various business applications, and configuration flows and parameters for rapid deployment, and can develop a verified application program and provide the verified application program to an application program list for the intelligent operation control terminal to select and run.

Figure 6:
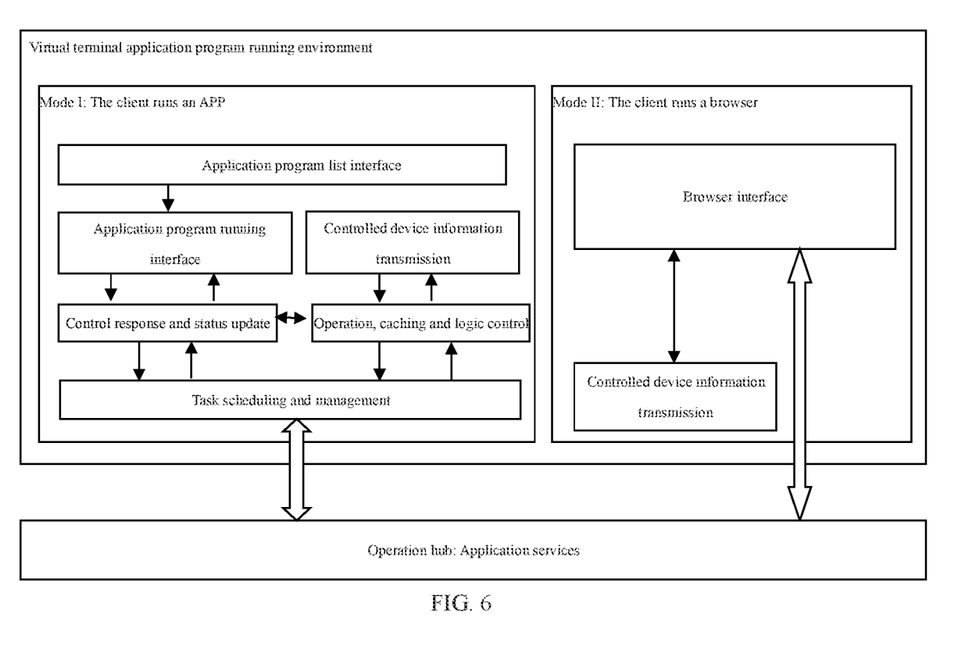
FIG. 6 is a schematic diagram of a functional structure of an application program running environment according to the present disclosure.

The application program running environment includes two running modes:

Mode I: The virtual terminal (client) runs an APP.

Mode II: The virtual terminal (client) runs a browser.

In Mode I, the application program running environment includes the following functions:
1. Application program list interface display function.
2. Application program running interface display function.
3. Control response and status update functions: process and respond to operation information of the human-computer interaction device, send the operation information to "task scheduling and management", and send the returned data and "operation, caching and logic control" result information to the display interface for status update.
4. Controlled device information transmission function: carry out data interaction between the application program and the targeted controlled device through controlled device mapping.
5. Operation, caching and logic control functions: simple operation, data caching and logic control run by the application program on the virtual terminal.
6. Task scheduling and management functions: obtain required operation services, especially complex operation services, storage services and other services, from the server through an API or other interfaces.

In Mode II, the application program running environment includes the following functions:
1. Browser interface (application program list interface and selected application program running interface) display function: as a typical application, the browser interface obtains required services from the server using the http+SSL protocol.
2. Controlled device information data transmission function.

A data interaction flow between the virtual terminal and the controlled device includes:
1. Processing and transmission process of controlled device data received by the virtual terminal:

Step I (note: items of this step can be processed in parallel):
1) determining a communication protocol of a device data packet received by an RJ45 interface according to characteristics of the data packet and a set of protocols maintained by the intelligent operation control terminal, and parsing the data packet using the corresponding protocol (for example, TCP/IP, OPC-UA or the like);
2) determining a communication protocol of a device data packet received by an optical fiber interface according to characteristics of the data packet and the set of protocols maintained by the intelligent operation control terminal, and parsing the data packet using the corresponding protocol (for example, TCP/IP, OPC-UA or the like);
3) determining a communication protocol of a device data packet received by a USB interface according to characteristics of the data packet and the set of protocols maintained by the intelligent operation control terminal, and parsing the data packet using the USB standard protocol;

4) determining a communication protocol of a device data packet received by a WIFI interface according to characteristics of the data packet and the set of protocols maintained by the intelligent operation control terminal, and parsing the data packet using the WIFI standard protocol;
5) determining a communication protocol of a device data packet received by a Bluetooth interface according to characteristics of the data packet and the set of protocols maintained by the intelligent operation control terminal, and entering step II directly for processing;
6) determining a communication protocol of a device data packet received by an RS485/RS422 interface according to characteristics of the data packet and the set of protocols maintained by the intelligent operation control terminal, and entering step II directly for processing;
7) determining a communication protocol of a device data packet received by an RS232 interface according to characteristics of the data packet and the set of protocols maintained by the intelligent operation control terminal, and entering step II directly for processing; and
8) determining a communication protocol of a device data packet received by an SMEMA interface according to characteristics of the data packet and the set of protocols maintained by the intelligent operation control terminal, and entering step II directly for processing.

Step II:
1) adding a data packet identifier ID to all the received data packets or the data packets that have been parsed in step I, and carrying out caching;
2) parsing the data packet according to precedence information configured by the application;
3) determining the communication protocol of the data packet according to the characteristics of the data packet and the set of protocols (RS232, Modbus Rtu, DART, TTL, PROFIBUS, SMEMA, RS485 bus, CAN bus and the like) maintained by the intelligent operation control terminal;
4) parsing the data packet using the corresponding protocol; 5) converting the parsed data into a custom protocol (or multiple custom protocols) directly according to data packet length requirements of the network protocol, or splitting the data and converting the split data into the custom protocol; and
6) encrypting the custom protocol data packet by a custom encryption algorithm to obtain an encrypted data packet.

Step III:
1) inserting an information set of device ID, device type, custom protocol type, device protocol type, packet ID, packet length, subpacket ID, subpacket length, verification information, custom encryption information, target virtual terminal information and the like into a header of the encrypted data packet as a custom header of the encrypted data packet; and
2) encapsulating a physical layer, a data link layer, a network layer and a transport layer for the encrypted data packet containing the custom header according to TCP/IP protocol or TSN protocol or OPC-UA protocol or a new generation of industrial time deterministic network protocol to form a network transmission data packet.

Step IV:
1) transmitting the network transmission data packet to the operation hub through the network;
2) parsing, by the operation hub, the network transmission data packet to obtain the custom header information and the encrypted data packet, and carrying out caching; and
3) transmitting the custom header information and the encrypted data packet to the corresponding virtual terminal according to the target virtual terminal information in the custom header information.

Step V:
1) parsing, by the virtual terminal, the encrypted data packet according to the custom header information and a self-authorized key to further parse out a custom protocol data packet, and carrying out caching; and
2) parsing out a device protocol data packet from the custom protocol data packet, carrying out subpacket combining in the case that there are subpackets, and then parsing out the device protocol data packet.

Step VI:
1) caching the custom header information; and
2) providing the parsed out device protocol data packet information to an application program for processing (data operation, storage and logic control).

2. Processing and transmission process of the data fed back by the virtual terminal to the controlled device:

Step I:
1) encapsulating the data to be fed back to the controlled device into a corresponding controlled device communication protocol packet according to the cached corresponding custom header information, and adding an identifier ID to the controlled device communication protocol packet, wherein as required, the packet may be divided into subpackets, information such as a subpacket identifier ID may be added, and the data packet may be encrypted; at the same time, editing the custom header information that is fed back; and
2) encapsulating a physical layer, a data link layer, a network layer and a transport layer for the encrypted data packet containing the custom header according to TCP/IP protocol or TSN protocol or OPC-UA protocol or a new generation of industrial time deterministic network protocol to form a network transmission data packet.

Step II:
1) transmitting the network transmission data packet to the intelligent operation control terminal through the network; and
2) parsing, by the intelligent operation control terminal, the network transmission data packet to obtain the custom header information and the encrypted data packet, and carrying out caching.

Step III:
1) parsing out a custom protocol data packet from the encrypted data packet according to the custom header information, and carrying out caching; and
2) parsing out a device protocol data packet from the custom protocol data packet according to the custom header information; carrying out subpacket combining in the case that there are subpackets, and then parsing out the device protocol data packet.

Step IV:
1) transmitting the device protocol data packet to a corresponding controlled device communication channel according to target device information in the custom header information.

Step V:
1) encapsulating a corresponding device data packet transmitted to an RJ45 interface using the corresponding protocol (for example, TCP/IP, OPC-UA or the like) according to the custom header information;
2) encapsulating a corresponding device data packet transmitted to an optical fiber interface using the corresponding protocol (for example, TCP/IP, OPC-UA or the like) according to the custom header information;
3) encapsulating a corresponding device data packet transmitted to a USB interface using the corresponding USB protocol according to the custom header information;
4) encapsulating a corresponding device data packet transmitted to a WIFI interface using the corresponding WIFI standard protocol according to the custom header information;
5) encapsulating a corresponding device data packet transmitted to a Bluetooth interface using the corresponding Bluetooth standard protocol according to the custom header information;
6) entering step VI directly for a corresponding device data packet transmitted to an RS485/RS422 interface;
7) entering step VI directly for a corresponding device data packet transmitted to an RS232 interface; and
8) entering step VI directly for a corresponding device data packet transmitted to an SMEMA interface; and Step VI: transmitting the data packet to the corresponding device.

Embodiment I

This embodiment provides an intelligent operation control apparatus, including a plurality of intelligent operation control systems. The intelligent operation control system is configured to include edge intelligent operation control systems, second-level intelligent operation control systems and nth-level intelligent operation control systems, wherein n is an integer greater than or equal to 2.

A plurality of the edge intelligent operation control systems are connected to one of the second-level intelligent operation control systems.

A plurality of the second-level intelligent operation control systems are connected to one of the third-level intelligent operation control systems. The rest of intelligent operation control systems are connected in this manner.

Each of the intelligent operation control systems includes an operation hub and at least one intelligent operation control terminal.

The operation hub is connected to all the intelligent operation control terminals. The operation hub is at least one server.

In another implementation, the intelligent operation control terminal includes: a processor, a northbound communication module, a southbound communication module and a human-computer interaction interface. The processor is connected to the operation hub through the northbound communication module. The processor is connected to a controlled device through the southbound communication module. The processor is connected to a control&interface display module through the human-computer interaction interface.

In another implementation, the northbound communication module includes an RJ45 interface, an optical fiber interface and a wireless module. The southbound communication module includes an RJ45 interface, an RS232 interface, a USB interface, an RS485 interface, an RS422 interface, an SMEMA interface, a Bluetooth interface, a WIFI interface and an optical fiber interface. The human-computer interaction interface includes a USB interface, an HDMI interface, a Bluetooth interface, a WIFI interface, an audio interface, a video interface and other wireless communication modules. The audio interface may be connected to at least one MIC to realize voice control of the intelligent operation control terminal by a user. The video interface may be connected to a camera to realize face recognition of an intelligent operation control terminal user, which can be used for user identity verification, sign-in and the like.

Based on the same inventive concept, the present disclosure also provides a system corresponding to the apparatus in Embodiment I. For details, reference is made to Embodiment II.

Embodiment II

In a second aspect in this embodiment, the present disclosure provides an intelligent operation control system, including a plurality of intelligent operation control systems. The intelligent operation control system is configured to include edge intelligent operation control systems, second-level intelligent operation control systems, third-level intelligent operation control systems and nth-level intelligent operation control systems, wherein n is an integer greater than or equal to 3.

A plurality of the edge intelligent operation control systems are connected to one of the second-level intelligent operation control systems.

A plurality of the second-level intelligent operation control systems are connected to one of the third-level intelligent operation control systems. The rest of intelligent operation control systems are connected in this manner.

Each of the intelligent operation control systems includes an operation hub and at least one intelligent operation control terminal.

The operation hub is connected to all the intelligent operation control terminals.

The edge intelligent operation control system realizes functions such as connection of devices with various communication interfaces, communication protocol parsing and conversion, data encryption and decryption, data transmission, and low-latency operation control.

The second-level intelligent operation control system provides services such as mirroring, backup, data management, operation and maintenance and PaaS.

The third-level intelligent operation control system provides services such as backup, big data management analysis, remote operation and maintenance, enterprise collaboration and resource sharing.

In another implementation, the intelligent operation control terminal includes: a processor, a northbound communication module, a southbound communication module and a human-computer interaction interface.

The processor includes a virtual terminal agent and a data collection and transmission module.

The virtual terminal agent establishes connection and communication with a virtual terminal in the operation hub through the northbound communication module, and establishes connection and communication with a human-computer interaction device through the human-computer interaction interface.

The virtual terminal agent is configured to provide:
1. management of external devices in collaboration with the data collection and transmission module; wherein the external devices include a controlled device and the human-computer interaction device;
2. authentication management, security mode control and strategy control;

3. human-computer interaction information processing and transmission control; and
4. processing and display of interface information transmitted by the virtual terminal and human-computer interaction data transmission.

The data collection and transmission module establishes connection and communication with the virtual terminal in the operation hub through the northbound communication module, and establishes connection and communication with the controlled device through the southbound communication module.

The data collection and transmission module is configured to provide:
1. management and control of the controlled device;
2. management and allocation of communication channels and operation resources; and
3. controlled device communication, data collection, protocol parsing, protocol conversion, data encryption and decryption and data transmission.

In another implementation, a data interaction flow between the virtual terminal and the controlled device includes: a processing and transmission process of controlled device data received by the virtual terminal and a processing and transmission process of data fed back by the virtual terminal to the controlled device.

In another implementation, the processing and transmission process of the controlled device data received by the virtual terminal includes:

Step I:
1) determining a communication protocol of a device data packet received by an RJ45 interface according to characteristics of the data packet and a set of protocols maintained by the intelligent operation control terminal, and parsing the data packet using the corresponding protocol;
2) determining a communication protocol of a device data packet received by an optical fiber interface according to characteristics of the data packet and the set of protocols maintained by the intelligent operation control terminal, and parsing the data packet using the corresponding protocol;
3) determining a communication protocol of a device data packet received by a USB interface according to characteristics of the data packet and the set of protocols maintained by the intelligent operation control terminal, and parsing the data packet using the USB standard protocol;
4) determining a communication protocol of a device data packet received by a WIFI interface according to characteristics of the data packet and the set of protocols maintained by the intelligent operation control terminal, and parsing the data packet using the WIFI standard protocol;
5) determining a communication protocol of a device data packet received by a Bluetooth interface according to characteristics of the data packet and the set of protocols maintained by the intelligent operation control terminal, and entering step II directly for processing;
6) determining a communication protocol of a device data packet received by an RS485/RS422 interface according to characteristics of the data packet and the set of protocols maintained by the intelligent operation control terminal, and entering step II directly for processing;
7) determining a communication protocol of a device data packet received by an RS232 interface according to characteristics of the data packet and the set of protocols maintained by the intelligent operation control terminal, and entering step II directly for processing; and
8) determining a communication protocol of a device data packet received by an SMEMA interface according to characteristics of the data packet and the set of protocols maintained by the intelligent operation control terminal, and entering step II directly for processing;

Step II:
1) adding a data packet identifier ID to all the received data packets or the data packets that have been parsed in step I, and carrying out caching;
2) parsing the data packet according to precedence information configured by the application;
3) determining the communication protocol of the data packet according to the characteristics of the data packet and the set of protocols maintained by the intelligent operation control terminal;
4) parsing the data packet using the corresponding protocol;
5) converting the parsed data into a custom protocol directly according to data packet length requirements of the network protocol, or splitting the data and converting the split data into the custom protocol; and
6) encrypting the custom protocol data packet by a custom encryption algorithm to obtain an encrypted data packet;

Step III:
1) inserting an information set of device ID, device type, custom protocol type, device protocol type, packet ID, packet length, subpacket ID, subpacket length, verification information, custom encryption information and target virtual terminal information into a header of the encrypted data packet as a custom header of the encrypted data packet; and
2) encapsulating a physical layer, a data link layer, a network layer and a transport layer for the encrypted data packet containing the custom header according to TCP/IP protocol or TSN protocol or OPC-UA protocol or a new generation of industrial time deterministic network protocol to form a network transmission data packet;

Step IV:
1) transmitting the network transmission data packet to the operation hub through the network;
2) parsing, by the operation hub, the network transmission data packet to obtain the custom header information and the encrypted data packet, and carrying out caching; and
3) transmitting the custom header information and the encrypted data packet to the corresponding virtual terminal according to the target virtual terminal information in the custom header information;

Step V:
1) parsing, by the virtual terminal, the encrypted data packet according to the custom header information and a self-authorized key to further parse out a custom protocol data packet, and carrying out caching; and
2) parsing out a device protocol data packet from the custom protocol data packet; carrying out subpacket combining in the case that there are subpackets, and then parsing out the device protocol data packe; and Step VI:
1) caching the custom header information; and
2) providing the parsed out device protocol data packet information to an application program for processing.

In another implementation, the processing and transmission process of the data fed back by the virtual terminal to the controlled device includes:

Step I:
1) encapsulating the data to be fed back to the controlled device into a corresponding controlled device communication protocol packet according to the cached corresponding custom header information, and adding an identifier ID to the controlled device communication protocol packet, wherein as required, the packet is divided into subpackets, a subpacket identifier ID is added, and the data packet is encrypted; at the same time, editing the custom header information that is fed back; and
2) encapsulating a physical layer, a data link layer, a network layer and a transport layer for the encrypted data packet containing the custom header according to TCP/IP protocol or TSN protocol or OPC-UA protocol or a new generation of industrial time deterministic network protocol to form a network transmission data packet;

Step II:
1) transmitting the network transmission data packet to the intelligent operation control terminal through the network; and
2) parsing, by the intelligent operation control terminal, the network transmission data packet to obtain the custom header information and the encrypted data packet, and carrying out caching;

Step III:
1) parsing the encrypted data packet according to the custom header information to obtain a custom protocol data packet, and carrying out caching; and
2) parsing out a device protocol data packet from the custom protocol data packet according to the custom header information; carrying out subpacket combining in the case that there are subpackets, and then parsing out the device protocol data packet;

Step IV:
transmitting the device protocol data packet to a corresponding controlled device communication channel according to target device information in the custom header information;

Step V:
1) encapsulating a corresponding device data packet transmitted to an RJ45 interface using the corresponding protocol according to the custom header information;
2) encapsulating a corresponding device data packet transmitted to an optical fiber interface using the corresponding protocol according to the custom header information;
3) encapsulating a corresponding device data packet transmitted to a USB interface using the corresponding USB protocol according to the custom header information;
4) encapsulating a corresponding device data packet transmitted to a WIFI interface using the corresponding WIFI standard protocol according to the custom header information;
5) encapsulating a corresponding device data packet transmitted to a Bluetooth interface using the corresponding Bluetooth standard protocol according to the custom header information;
6) entering step VI directly for a corresponding device data packet transmitted to an RS485/RS422 interface;
7) entering step VI directly for a corresponding device data packet transmitted to an RS232 interface; and
8) entering step VI directly for a corresponding device data packet transmitted to an SMEMA interface; and step VI: transmitting the data packet to the corresponding device.

In another implementation, the operation hub includes infrastructure, a computing system, a storage system, a resource pool, a virtual terminal, application management, operation hub management and access control.

The infrastructure includes a processor, an intelligent data warehouse, network devices and network security devices. The intelligent data warehouse stores data in a data cube structure, and provides a data source for multi-dimensional big data analysis.

The computing system includes CPU resources, memory resources and hard disk resources, and provides logical operations and storage resources.

The storage system includes data access interfaces, various database kernels and data files, and provides storage and access services for various types of data.

The resource pool includes a physical resource pool and an application resource pool. The physical resource pool is a resource sharing pool provided after the computing system and the storage system are virtualized. The application resource pool provides allocation and management of resources required for the operation of various application services.

The application management includes PaaS service, application store, application authorization, application distribution and application deployment.

The operation hub management includes virtual terminal management, container service, virtual machine service, server resource management, operation and maintenance management, and disaster tolerance management.

The access control includes UI user interface entry, system access and authentication control.

The UI user interface entry provides a user interface entry for intelligent operation control terminal users and operation hub administrators.

The system access provides access of a lower-level intelligent operation control system and access to an upper-level intelligent operation control system.

The authentication control provides system security control, identity recognition, security key decryption verification and digital certificate verification for the UI user interface entry and the system access.

To access the virtual terminal, the intelligent operation control terminal needs to undergo the authentication control of the operation hub to perform identity and authority recognition/control of the intelligent operation control terminal, and then enter the UI user interface entry to perform identity and authority recognition/control of the user. The authorization of the intelligent operation control terminal and the authorization of the user are managed and controlled by the operation hub.

In another implementation, the virtual terminal is at least one virtual terminal built by using an application container engine.

The virtual terminal has two environment options: an application development environment and an application program running environment.

The application development environment of the virtual terminal establishes a collaborative development environment for sharing development resources through a PaaS development platform provided by the application management. The PaaS development platform is a development platform provided by an upper-level intelligent operation control system.

The application development environment includes an application development platform interface and development resources. The development resources include an intelligent operation control terminal resource pool, external terminal device interface mapping, an application component pool, a development tool set and application deployment tools, and are configured to develop various business applications, and configuration flows and parameters for rapid deployment, and develop a verified application program and provide the verified application program to an application program list for the intelligent operation control terminal to select and run.

The application program running environment includes two running modes:

The virtual terminal runs an APP and the virtual terminal runs a browser.

Since the system introduced in Embodiment II of the present disclosure is the system adopted for implementing the apparatus of Embodiment I of the present disclosure, based on the apparatus introduced in Embodiment I of the present disclosure, those skilled in the art can understand the specific structure and variant of the apparatus, so the details will not be repeated here. All the systems adopted by the apparatus in Embodiment I of the present disclosure fall within the protection scope of the present disclosure.

Although the detailed description of the present disclosure has been described above, those skilled in the art should understand that the specific embodiments described herein are only illustrative and are not intended to limit the scope of the present disclosure. Any equivalent modifications and changes made by those skilled in the art in accordance with the spirit of the present disclosure should be included in the protection scope of the claims of the present disclosure.

What is claimed is:

1. An intelligent operation control system, comprising:
   a plurality of intelligent operation control systems; wherein the intelligent operation control system is configured to include edge intelligent operation control systems, second-level intelligent operation control systems, third-level intelligent operation control systems and nth-level intelligent operation control systems; wherein n is an integer greater than or equal to 3;
   a plurality of the edge intelligent operation control systems are connected to one of the second-level intelligent operation control systems;
   a plurality of the second-level intelligent operation control systems are connected to one of the third-level intelligent operation control systems; the rest of intelligent operation control systems are connected in this manner;
   each of the intelligent operation control systems comprises an operation hub and at least one intelligent operation control terminal;
   the operation hub is connected to all the intelligent operation control terminals;
   the edge intelligent operation control system realizes functions comprising at least one of connection of devices with various communication interfaces, communication protocol parsing and conversion, data encryption and decryption, data transmission, and low-latency operation control;
   the second-level intelligent operation control system provides services comprising at least one of mirroring, backup, data management, operation and maintenance and PaaS; and
   the third-level intelligent operation control system provides services comprising at least one of backup, big data management analysis, remote operation and maintenance, enterprise collaboration and resource sharing;
   the intelligent operation control terminal comprises: a processor, a northbound communication module, a southbound communication module and a human-computer interaction interface;
   the processor comprises a virtual terminal agent and a data collection and transmission module;
   the virtual terminal agent establishes connection and communication with a virtual terminal in the operation hub through the northbound communication module, and establishes connection and communication with a human-computer interaction device through the human-computer interaction interface;
   the virtual terminal agent is configured to provide:
   1. management of external devices in collaboration with the data collection and transmission module; wherein the external devices comprise a controlled device and the human-computer interaction device;
   2. authentication management, security mode control and strategy control;
   3. human-computer interaction information processing and transmission control; and
   4. processing and display of interface information transmitted by the virtual terminal and human-computer interaction data transmission;
   the data collection and transmission module establishes connection and communication with the virtual terminal in the operation hub through the northbound communication module, and establishes connection and communication with the controlled device through the southbound communication module; and
   the data collection and transmission module is configured to provide:
   1. management and control of the controlled device;
   2. management and allocation of communication channels and operation resources; and
   3. controlled device communication, data collection, protocol parsing, protocol conversion, data encryption and decryption and data transmission;
   a data interaction flow between the virtual terminal and the controlled device comprises: a processing and transmission process of controlled device data received by the virtual terminal and a processing and transmission process of data fed back by the virtual terminal to the controlled device;
   wherein the processing and transmission process of the controlled device data received by the virtual terminal comprises:
   step I:
   1) determining a communication protocol of a device data packet received by an RJ45 interface according to characteristics of the data packet and a set of protocols maintained by the intelligent operation control terminal, and parsing the data packet using the corresponding protocol;
   2) determining a communication protocol of a device data packet received by an optical fiber interface according to characteristics of the data packet and the set of protocols maintained by the intelligent operation control terminal, and parsing the data packet using the corresponding protocol;
   3) determining a communication protocol of a device data packet received by a USB interface according to characteristics of the data packet and the set of protocols maintained by the intelligent operation control terminal, and parsing the data packet using the USB standard protocol;
4) determining a communication protocol of a device data packet received by a WIFI interface according to characteristics of the data packet and the set of protocols maintained by the intelligent operation control terminal, and parsing the data packet using the WIFI standard protocol;
5) determining a communication protocol of a device data packet received by a Bluetooth interface according to characteristics of the data packet and the set of protocols maintained by the intelligent operation control terminal, and entering step II directly for processing;
6) determining a communication protocol of a device data packet received by an RS485/RS422 interface according to characteristics of the data packet and the set of protocols maintained by the intelligent operation control terminal, and entering step II directly for processing;
7) determining a communication protocol of a device data packet received by an RS232 interface according to characteristics of the data packet and the set of protocols maintained by the intelligent operation control terminal, and entering step II directly for processing; and
8) Determining a communication protocol of a device data packet received by an SMEMA interface according to characteristics of the data packet and the set of protocols maintained by the intelligent operation control terminal, and entering step II directly for processing;

step II:
1) adding a data packet identifier ID to all the received data packets or the data packets that have been parsed in step I, and carrying out caching;
2) parsing the data packet according to precedence information configured by the application;
3) determining the communication protocol of the data packet according to the characteristics of the data packet and the set of protocols maintained by the intelligent operation control terminal;
4) parsing the data packet using the corresponding protocol;
5) converting the parsed data into a custom protocol directly according to data packet length requirements of the network protocol, or splitting the data and converting the split data into the custom protocol; and
6) encrypting the custom protocol data packet by a custom encryption algorithm to obtain an encrypted data packet;

step III:
1) inserting an information set of device ID, device type, custom protocol type, device protocol type, packet ID, packet length, subpacket ID, subpacket length, verification information, custom encryption information and target virtual terminal information into a header of the encrypted data packet as a custom header of the encrypted data packet; and
2) encapsulating a physical layer, a data link layer, a network layer and a transport layer for the encrypted data packet containing the custom header according to TCP/IP protocol or TSN protocol or OPC-UA protocol or a new generation of industrial time deterministic network protocol to form a network transmission data packet;

step IV:
1) transmitting the network transmission data packet to the operation hub through the network;
2) parsing, by the operation hub, the network transmission data packet to obtain custom header information and the encrypted data packet, and carrying out caching; and
3) transmitting the custom header information and the encrypted data packet to the corresponding virtual terminal according to the target virtual terminal information in the custom header information;

step V:
1) parsing, by the virtual terminal, the encrypted data packet according to the custom header information and a self-authorized key to further parse out a custom protocol data packet, and carrying out caching; and
2) parsing out a device protocol data packet from the custom protocol data packet; carrying out subpacket combining in the case that there are subpackets, and then parsing out the device protocol data packet; and step VI:
1) caching the custom header information; and
2) providing the parsed out device protocol data packet information to an application program for processing.

2. The intelligent operation control system according to claim 1, wherein the operation hub comprises infrastructure, a computing system, a storage system, a resource pool, a virtual terminal, application management, operation hub management and access control;
the infrastructure comprises a processor, an intelligent data warehouse, network devices and network security devices; the intelligent data warehouse stores data in a data cube structure, and provides a data source for multi-dimensional big data analysis;
the computing system comprises CPU resources, memory resources and hard disk resources, and provides logical operations and storage resources;
the storage system comprises data access interfaces, various database kernels and data files, and provides storage and access services for various types of data;
the resource pool comprises a physical resource pool and an application resource pool; the physical resource pool is a resource sharing pool provided after the computing system and the storage system are virtualized; the application resource pool provides allocation and management of resources required for the operation of various application services;
the application management comprises PaaS service, application store, application authorization, application distribution and application deployment;
the operation hub management comprises virtual terminal management, container service, virtual machine service, server resource management, operation and maintenance management, and disaster tolerance management;
the access control comprises UI user interface entry, system access and authentication control;
the UI user interface entry provides a user interface entry for intelligent operation control terminal users and operation hub administrators;
the system access provides access of a lower-level intelligent operation control system and access to an upper-level intelligent operation control system;
the authentication control provides system security control, identity recognition, security key decryption verification and digital certificate verification for the UI user interface entry and the system access;

to access the virtual terminal, the intelligent operation control terminal needs to undergo the authentication control of the operation hub to perform identity and authority recognition/control of the intelligent operation control terminal, and then enter the UI user interface entry to perform identity and authority recognition/control of the user; and the authorization of the intelligent operation control terminal and the authorization of the user are managed and controlled by the operation hub.

3. The intelligent operation control system according to claim 2, wherein
the virtual terminal is at least one virtual terminal built by using an application container engine;
the virtual terminal has two environment options: an application development environment and an application program running environment;
the application development environment of the virtual terminal establishes a collaborative development environment for sharing development resources through a PaaS development platform provided by the application management, the PaaS development platform being a development platform provided by an upper-level intelligent operation control system;
the application development environment comprises an application development platform interface and development resources; the development resources comprise an intelligent operation control terminal resource pool, external terminal device interface mapping, an application component pool, a development tool set and application deployment tools, and are configured to develop various business applications, and configuration flows and parameters for rapid deployment, and develop a verified application program and provide the verified application program to an application program list for the intelligent operation control terminal to select and run; and
the application program running environment comprises two running modes:
the virtual terminal runs an APP and the virtual terminal runs a browser.

4. An intelligent operation control system, comprising:
a plurality of intelligent operation control systems; wherein the intelligent operation control system is configured to include edge intelligent operation control systems, second-level intelligent operation control systems, third-level intelligent operation control systems and nth-level intelligent operation control systems; wherein n is an integer greater than or equal to 3;
a plurality of the edge intelligent operation control systems are connected to one of the second-level intelligent operation control systems;
a plurality of the second-level intelligent operation control systems are connected to one of the third-level intelligent operation control systems; the rest of intelligent operation control systems are connected in this manner;
each of the intelligent operation control systems comprises an operation hub and at least one intelligent operation control terminal;
the operation hub is connected to all the intelligent operation control terminals;
the edge intelligent operation control system realizes functions comprising at least one of connection of devices with various communication interfaces, communication protocol parsing and conversion, data encryption and decryption, data transmission, and low-latency operation control;
the second-level intelligent operation control system provides services comprising at least one of mirroring, backup, data management, operation and maintenance and PaaS; and
the third-level intelligent operation control system provides services comprising at least one of backup, big data management analysis, remote operation and maintenance, enterprise collaboration and resource sharing;
the intelligent operation control terminal comprises: a processor, a northbound communication module, a southbound communication module and a human-computer interaction interface;
the processor comprises a virtual terminal agent and a data collection and transmission module;
the virtual terminal agent establishes connection and communication with a virtual terminal in the operation hub through the northbound communication module, and establishes connection and communication with a human-computer interaction device through the human-computer interaction interface;
the virtual terminal agent is configured to provide:
1. management of external devices in collaboration with the data collection and transmission module; wherein the external devices comprise a controlled device and the human-computer interaction device;
2. authentication management, security mode control and strategy control;
3. human-computer interaction information processing and transmission control; and
4. processing and display of interface information transmitted by the virtual terminal and human-computer interaction data transmission;
the data collection and transmission module establishes connection and communication with the virtual terminal in the operation hub through the northbound communication module, and establishes connection and communication with the controlled device through the southbound communication module; and
the data collection and transmission module is configured to provide:
1. management and control of the controlled device;
2. management and allocation of communication channels and operation resources; and
3. controlled device communication, data collection, protocol parsing, protocol conversion, data encryption and decryption and data transmission;
a data interaction flow between the virtual terminal and the controlled device comprises: a processing and transmission process of controlled device data received by the virtual terminal and a processing and transmission process of data fed back by the virtual terminal to the controlled device;
wherein the processing and transmission process of the data fed back by the virtual terminal to the controlled device comprises:
step I:
1) encapsulating the data to be fed back to the controlled device into a corresponding controlled device communication protocol packet according to the cached corresponding custom header information, and adding an identifier ID to the controlled device communication protocol packet, wherein as required, the packet is divided into subpackets, a subpacket identifier ID is added, and the data packet is encrypted; at the same time, editing the custom header information that is fed back; and 2) encapsulating a physical layer, a data link layer, a network layer and a transport layer for the encrypted data packet containing the custom header according to TCP/IP protocol or TSN protocol or OPC-UA protocol or a new generation of industrial time deterministic network protocol to form a network transmission data packet;

step II:

1) transmitting the network transmission data packet to the intelligent operation control terminal through the network; and
2) parsing, by the intelligent operation control terminal, the network transmission data packet to obtain the custom header information and the encrypted data packet, and carrying out caching;

step III:

1) parsing the encrypted data packet according to the custom header information to obtain a custom protocol data packet, and carrying out caching; and
2) parsing out a device protocol data packet from the custom protocol data packet according to the custom header information; carrying out subpacket combining in the case that there are subpackets, and then parsing out the device protocol data packet;

step IV:

transmitting the device protocol data packet to a corresponding controlled device communication channel according to target device information in the custom header information;

step V:

1) encapsulating a corresponding device data packet transmitted to an RJ45 interface using the corresponding protocol according to the custom header information;
2) encapsulating a corresponding device data packet transmitted to an optical fiber interface using the corresponding protocol according to the custom header information;
3) encapsulating a corresponding device data packet transmitted to a USB interface using the corresponding USB protocol according to the custom header information;
4) encapsulating a corresponding device data packet transmitted to a WIFI interface using the corresponding WIFI standard protocol according to the custom header information;
5) encapsulating a corresponding device data packet transmitted to a Bluetooth interface using the corresponding Bluetooth standard protocol according to the custom header information;
6) entering step VI directly for a corresponding device data packet transmitted to an RS485/RS422 interface;
7) Entering step VI directly for a corresponding device data packet transmitted to an RS232 interface; and
8) Entering step VI directly for a corresponding device data packet transmitted to an SMEMA interface; and step VI: transmitting the data packet to the corresponding device.

\* \* \* \* \*